United States Patent [19]

Deeley

[11] Patent Number: 5,689,990
[45] Date of Patent: Nov. 25, 1997

[54] SHEET MATERIAL, METHOD OF PRODUCING SAME AND ROLLS FOR USE IN THE METHOD

[75] Inventor: Geoffrey Thomas Deeley, Oldbury, United Kingdom

[73] Assignee: Hadley Industries PLC, United Kingdom

[21] Appl. No.: 436,354

[22] PCT Filed: Feb. 8, 1993

[86] PCT No.: PCT/GB93/01117

§ 371 Date: Apr. 15, 1995

§ 102(e) Date: May 15, 1995

[87] PCT Pub. No.: WO94/12294

PCT Pub. Date: Jun. 9, 1994

[30] Foreign Application Priority Data

Nov. 21, 1992 [GB] United Kingdom ............... 9224452

[51] Int. Cl.⁶ .................................................. B21D 49/00
[52] U.S. Cl. .......................... 72/196; 72/379.2; 52/630
[58] Field of Search ............................ 52/630, 789.1; 72/190, 191, 196, 197, 379.2

[56] References Cited

U.S. PATENT DOCUMENTS

| | | | |
|---|---|---|---|
| 2,441,476 | 5/1948 | Ewald | 72/196 |
| 2,481,046 | 9/1949 | Scurlock | 52/789.1 |
| 2,878,553 | 3/1959 | Hirsch. | |
| 3,992,162 | 11/1976 | Gewiss. | |
| 4,343,866 | 8/1982 | Oser. | |

FOREIGN PATENT DOCUMENTS

| | | |
|---|---|---|
| 638854 | 2/1966 | Belgium. |
| 990018 | 9/1951 | France. |
| 1262222 | 10/1961 | France. |
| 1323237 | 2/1963 | France ............................ 72/379.2 |
| 2740582 | 3/1978 | Germany. |
| 48281 | 11/1910 | Switzerland. |
| 1118607 | 7/1968 | United Kingdom. |
| 1132593 | 11/1968 | United Kingdom. |
| 1305489 | 1/1973 | United Kingdom. |
| 1420929 | 1/1976 | United Kingdom. |
| 1424567 | 2/1976 | United Kingdom. |
| 1479062 | 7/1977 | United Kingdom. |
| 2011313 | 7/1979 | United Kingdom. |
| 1593346 | 7/1981 | United Kingdom. |

*Primary Examiner*—Lowell A. Larson
*Attorney, Agent, or Firm*—Caesar, Rivise, Bernstein, Cohen & Pokotilow, Ltd.

[57] ABSTRACT

A stud for use in partitioning is formed by passing plain sheet material between a pair of rolls (18, 19), each having projections, to form projections at both of the opposite surfaces of the material and then roll-forming the material to a channel, the positions of the projections and recesses at each surface of the material being such that lines drawn on a surface of the material between adjacent rows of projections and depressions are not rectilinear.

14 Claims, 4 Drawing Sheets

SHEET MATERIAL, METHOD OF PRODUCING SAME AND ROLLS FOR USE IN THE METHOD

From one aspect, the present invention relates to sheet material of the kind, hereinafter called the kind specified, having on both of its faces a plurality of rows of projections, each projection having been formed by deforming the sheet material locally to leave a corresponding depression at the opposite face of the material. Sheet material of the kind specified is stiffer than the plain sheet material from which it is formed and the mass of material required for a particular duty can be reduced by using sheet material of the kind specified in place of plain sheet material.

An example of sheet material of the kind specified is disclosed in CH-486,281. In this example, there extend in a first direction rows of alternating projections and depressions and straight lines can be drawn on a surface of the material between adjacent ones of these rows. The projections and depressions also form rows which extend in a second direction perpendicular to the first direction and between which further straight lines can be drawn on the surface of the material. Along these straight lines, the overall thickness of the material is substantially equal to the thickness of the plain sheet material from which the material of the kind specified is formed and the material can bend along these lines considerably more easily than it can bend along a centreline of one of the rows. Also in the material disclosed in this published specification, the overall thickness of the sheet material of the kind specified is approximately twelve times the thickness at a point where the thickness has a maximum value, and which thickness we call herein the gauge of the material.

An alternative construction material is disclosed in GB 2011313A of Van Leer. It is disclosed that this construction element may be manufactured from concrete, steel plate, or synthetic resin and that the manufacturing process may include folding and cutting or deep-drawing. The construction element has rows of projections at each of its faces and also has rows of apertures between the rows of projections. The overall thickness of the construction element is many times the gauge of the material of which it is formed As used herein, the term "sheet material" embraces generally flat material as described in the aforesaid Swiss patent specification and products made by bending generally flat sheet material, examples of which products are mentioned in our published International patent application no. PCT/GB81/00095.

According to a first aspect of the invention, we provide sheet material of the kind specified wherein the relative positions of the projections and depressions are such that lines drawn on a surface of the material between adjacent rows of projections and depressions are not rectilinear.

The overall thickness of sheet material in accordance with the invention as viewed in any cross-section in a plane which is generally perpendicular to the sheet material is substantially greater than the gauge of the material; in contra-distinction to the sheet material disclosed in CH-486,281, where the overall thickness of the material in certain planes which are generally perpendicular to the sheet material is substantially equal to the gauge. In all such cross sections, sheet material in accordance with the invention is undulatory and there is no place where the material can be cut along a straight line and the resulting cross section of the material will be rectilinear.

The overall thickness of sheet material embodying the invention is determined by the heights of the projections at both faces of the material. The height of projections which is sufficient to ensure that lines drawn on a surface of the material between adjacent rows of projections and depressions are not rectilinear depends upon the pitch of the projections and depressions in the rows. We have found that an overall thickness of twice the gauge of the sheet material is generally a suitable thickness and sufficient to avoid rectilinear lines on the surface of the material. Preferably, the overall thickness is not more than four times the gauge of the material. More preferably, the overall thickness does not exceed three times the gauge of the material.

By limiting the overall thickness of the material to a value which is just sufficiently great to avoid the presence of rectilinear lines on either surface of the material, we find that we can avoid reducing the overall length of the sheet material significantly during formation of the projections. It will be understood that there is a tendency for the length of the sheet material to decrease when projections are formed over substantially the entire surface of sheet material. In the example disclosed in CH-486,281, there will be a large decrease in the length of the sheet material when the projections are formed to increase the overall thickness by a factor of approximately twelve. Although the resulting sheet material will be stiffer than the initial sheet material, the weight of sheet material per superficial unit of area will be much greater.

The projections on each face of the sheet material disclosed in CH-486,281 are close together and this characteristic enhances the weight per superficial unit of area. In sheet material in accordance with the present invention, the spacing between the crests of adjacent projections at each face of the material preferably exceeds three times the dimension of each of those crests measured in the same direction as said spacing.

The projections at each face of material embodying the present invention can be assigned to a variety of rows, for example rows extending along the material, rows extending across the material at right angles and rows extending across the material obliquely to the length of the material. In the row with the smallest pitch, the pitch (called herein the minimum pitch) is preferably within the range 2 mm to 5 mm. The minimum pitch is also preferably within the range four to ten times the gauge of the material. We have found that a minimum pitch of approximately six times the gauge of the material, in a case where the overall thickness is approximately twice the gauge, avoids the presence of rectilinear lines on either surface of the material and thereby achieves a substantial improvement in bending strength, as compared with the plain sheet material from which the material embodying the invention is formed, without any significant increase in the mass of material per superficial unit of area.

In a case where elongated sheet material is used, each projection preferably has a plurality of flanks facing in respective directions which are neither along the material nor perpendicular to the length of the material. We believe this arrangement results in a better weight to strength ratio than does the arrangement disclosed in CH-486,281, where flanks of the projections face in directions perpendicular to the length of the material.

In the preferred material embodying the invention, the array of projections at one face of the material is substantially identical with the array of projections at the opposite face of the material.

According to a second aspect of the invention, there is provided a method of producing sheet material of the kind specified wherein a plurality of teeth are provided on each of two rolls, each tooth having four flanks of involute form and each flank facing in a direction between an axial direction and a circumferential direction, the rolls are mounted for relative rotation about respective parallel axes spaced apart by a distance such that teeth on one roll extend into gaps between teeth on the other roll, the rolls are driven at the same speed and plain sheet material is passed between the rolls.

There is also provided in accordance with the invention a roll having on its periphery a plurality of teeth, each tooth having four flanks of involute form and each flank facing in a direction between an axial direction and a circumferential direction.

An example of sheet material embodying the first aspect of the invention and produced by a method in accordance with the second aspect of the invention, will now be described, with reference to the accompanying drawings, wherein.

Figure 1:
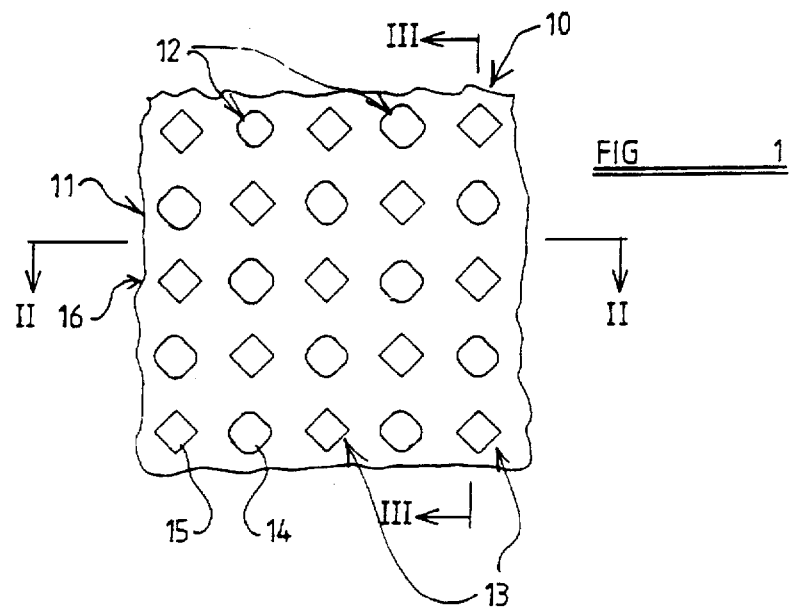
FIG. 1 shows a fragment of one face of the sheet material in plan view.

The sheet material illustrated in FIGS. 1 to 4 of the drawings is formed of metal and has on both of its faces a large number of projections and depressions, each projection at one face corresponding to a depression at the other face. The projections and depressions at one face are arranged in rectilinear rows in which projections and depressions alternate. One such row which extends longitudinally of the sheet material is indicated by the reference numeral 10, a further such row which is perpendicular to the row 10 is indicated by the reference numeral 11. There are rows 12 comprising only projections and inclined at 45° to the rows 10 and 11 and there are also rows 13 comprising only depressions and also inclined at 45° to the rows 10 and 11. Adjacent depressions and projections are sufficiently close to one another for there to be no substantially flat areas of sheet material between them.

Each projection has a crest 14 which is substantially flat and each depression has a base 15 which also is substantially flat.

Each crest 14 has a shape which is at least approximately that of a square, with the sides of the square inclined at 45° to the length of the sheet material. Each base 15 also has the shape of a square with sides parallel to those of the crests 14.

Adjacent crests 14 are spaced apart by a distance which varies with direction but which is at least twice the dimension of each crest measured in the same direction and which may be more than four times that dimension.

In FIG. 1, there is illustrated one face of the sheet material. The opposite face is substantially identical, in that there is a corresponding array of projections and recesses on the opposite face. It will be understood that the position of a depression at the face represented in FIG. 1 corresponds to the position of a projection at the opposite face. The preceding description of the projections and recesses applies to the projections and recesses on both of the faces. The size of the crests and other dimensions of the array at one face are the same as those of the array at the other face.

Figure 2:
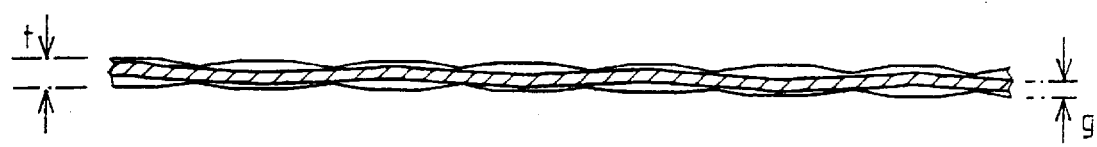
FIG. 2 shows a cross-section on the line II—II of FIG. 1.

FIG. 2 shows a cross-section of the sheet material in a plane which lies mid-way between the row 11 and an adjacent row 16. As can be seen from FIG. 2, the sheet material undulates in the plane mid-way between the rows 11 and 16 so that the overall thickness of the material in this plane is substantially greater than the gauge of the material g. A line drawn on either face of the material in the plane of the cross-section shown in FIG. 2 is not straight.

Figure 3:
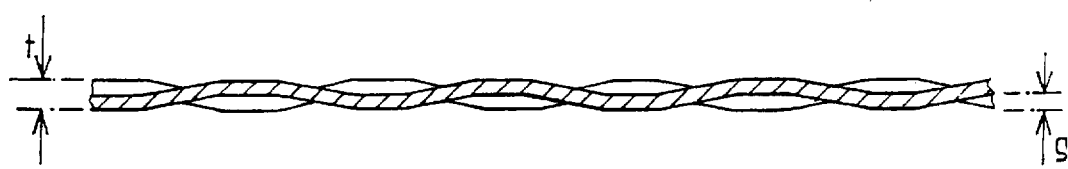
FIG. 3 shows a cross-section on the line III—III of FIG. 1.

The undulations of the material are more pronounced in a plane containing the centres of projections in the row 10. As shown in FIG. 3, the overall thickness of the material in this latter plane is approximately twice the gauge of the material. Generally, the overall thickness t does not exceed four times the gauge of the material and we prefer that, when the projections and depressions are first formed, the overall thickness should not be substantially greater than three times the gauge. Subsequent treatment of the material may reduce the overall thickness somewhat.

Figure 4:
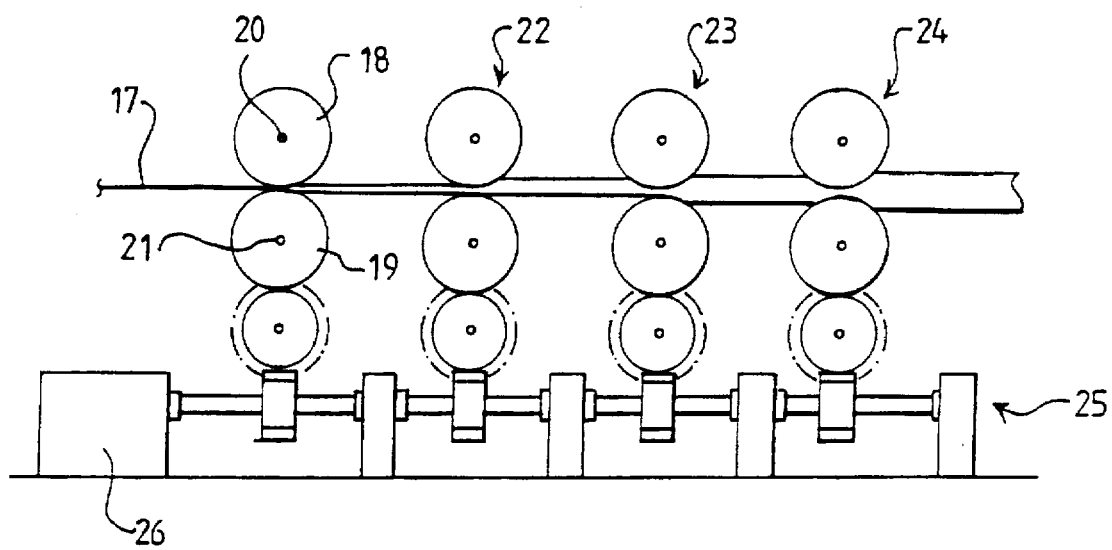
FIG. 4 illustrates diagrammatically production of the sheet material.

The sheet material illustrated in FIGS. 1, 2 and 3 is formed by the process illustrated in FIG. 4. In this process, plain sheet material 17 is drawn from a coil (not shown) and passes between a pair of rolls 18 and 19, each of which has at its periphery a number of teeth. The rolls are rotated about respective parallel axes 20 and 21 and the sheet material is engaged by and deformed by the teeth of the rolls. Each tooth pushes a part of the sheet material into a gap between teeth on the other roll to form a projection facing that other roll and a corresponding depression facing the one roll. Thus, the overall thickness of the sheet material is increased by forming projections on both of its faces.

From the roll pair 18 and 19, the sheet material passes between the rolls of further pairs 22, 23 and 24 which form the sheet material into a channel. The roll pair 18 and 19 and the roll pairs 22, 23 and 24 are driven by common drive means 25 of known form and including an electric motor 26. The rolls are driven at substantially the same peripheral speed so that the sheet material passes continuously and at the same speed between the rolls 18 and 19 and then between the rolls of the subsequent pairs. In place of the roll pairs 22, 23 and 24, there may be provided an alternative device or devices for modifying the sheet material in some other way. After modification of the shape of the sheet material has been completed, it may be cut into lengths for transportation and use.

Figure 5:
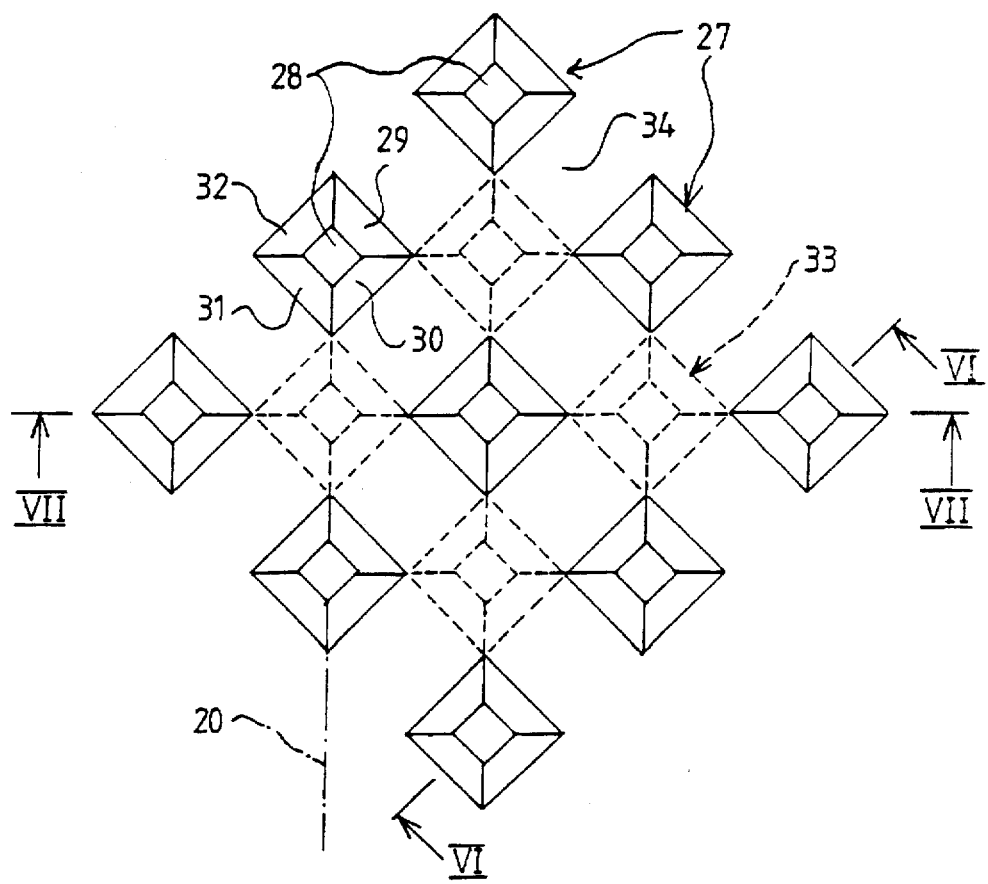
FIG. 5 is a fragmentary illustration of a part of a circumferential surface of one roll shown in FIG. 4 with the positions of teeth of an adjacent roll indicated by broken lines.
Figure 6:
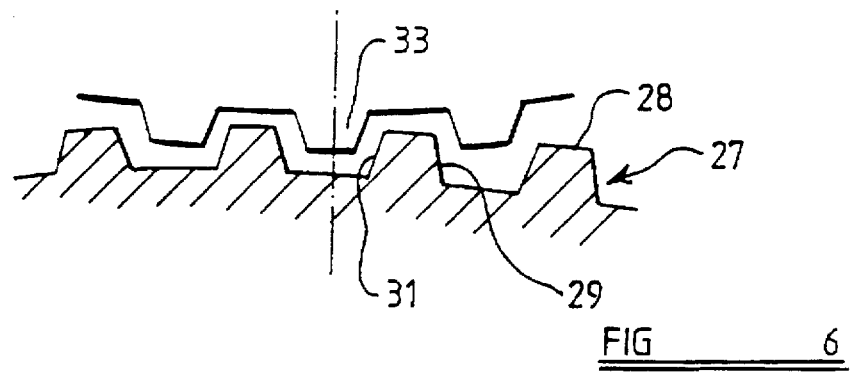
FIG. 6 is a cross-section on the line VI—VI of FIG. 5.
Figure 7:
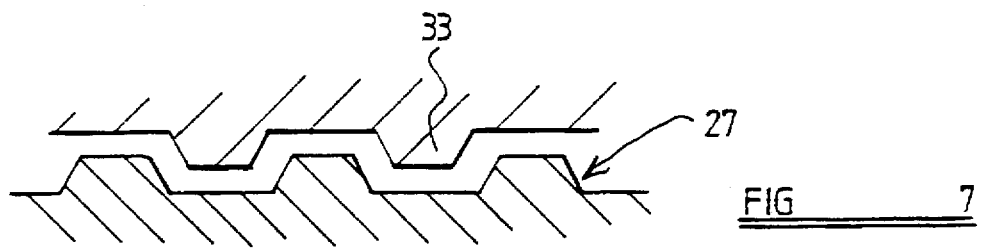
FIG. 7 is a cross-section on the line VII—VII of FIG. 5.

The rolls 18 and 19 have the same form and one of these rolls is illustrated in FIG. 5. This roll 19 has on its periphery a number of identical teeth 27 arranged in a plurality of helical rows which are inclined to the axis 20 of the roll at an angle of 45°. Each tooth has a tip 28 of square shape with the edges of the square being inclined to the axis 20 at an angle of 45°. From each edge of the tip, there extends a corresponding flank 29, 30, 31 and 32. Adjacent flanks meet at respective edges of the tooth. As viewed in a direction from one of these edges to the other, the flank between the two edges has the form of an involute curve. All flanks of all of the teeth have the same form. It will be noted that the flanks of the teeth on the rolls face in directions which are between a circumferential direction and an axial direction. In an alternative arrangement, shown in FIG. 8, the tips of the teeth 128 are longer in one direction inclined at 45° to the axis 120 than in the other such direction. In this arrangement, the grooves of one set of helical grooves between adjacent rows of the teeth are nearer to each other than are the grooves of the other such set.

The sheet material 17 is gripped by and stretched by the teeth when it passes between the rolls 18 and 19 so that the overall length of the sheet material is reduced only a little or not significantly. The reduction in the overall length (if any) depends upon a number of factors, including the thickness of the sheet material and the increase in the overall thickness which is caused by the rolls 18 and 19. We prefer that, in all cases, the length of the sheet material should not be reduced by more than 15% of the initial length. Generally, the length of the sheet material which leaves the rolls 18 and 19 is at least 90% of the initial length and we prefer to maintain the length of the sheet material within the range 95% to 100% of the initial length. We prefer that the overall thickness of the sheet material leaving the rolls 18 and 19 should be between two and three times the gauge of the sheet material. Subsequent treatment of the sheet material by the roll pairs 22, 23 and 24 reduces the overall thickness to a value which is approximately twice the gauge of the material.

As can be seen from FIG. 5, the flanks of the teeth 27 face those of adjacent teeth 27 across gaps 34 which are at least as wide as a tooth 27 at its root and which gaps 34 are not occupied by teeth 33 of the roll 18. At the nip between the rolls 18 and 19, the teeth 33 enter gaps between edges of the teeth 27 with edges of each tooth 33 facing edges of adjacent teeth 27.

In the gaps 34, the sheet metal is free to adopt a form determined by forces applied to the sheet at the tips of the teeth 27 and 33. These forces are such that the sheet does not remain flat in the gaps 34.

The separation between the tips of adjacent teeth 27 is at least twice the dimension of each of these tips measured in the same direction.

Figure 8:
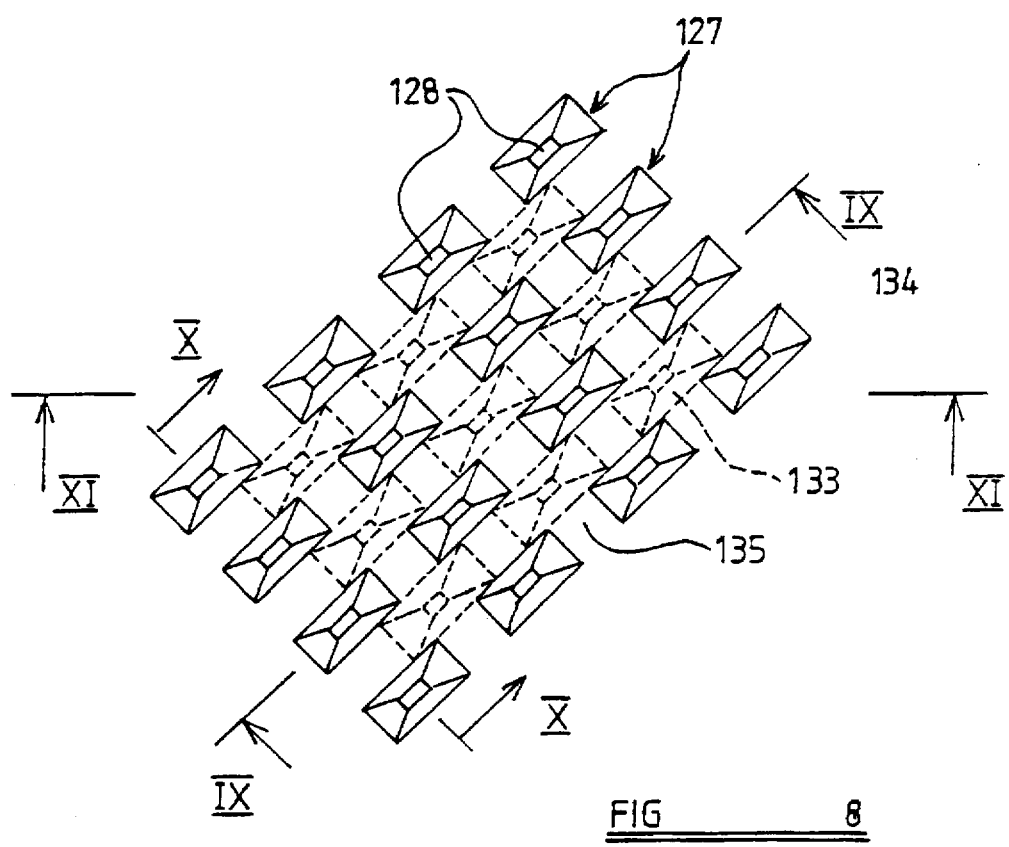
FIG. 8 is a view similar to FIG. 5 of an alternative roll.
Figure 9:
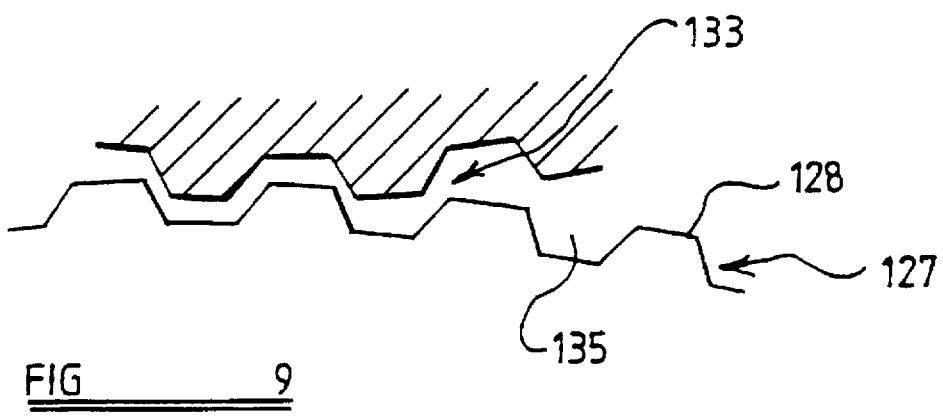
FIG. 9 is a cross-section on the line IX—IX of FIG. 8.
Figure 10:
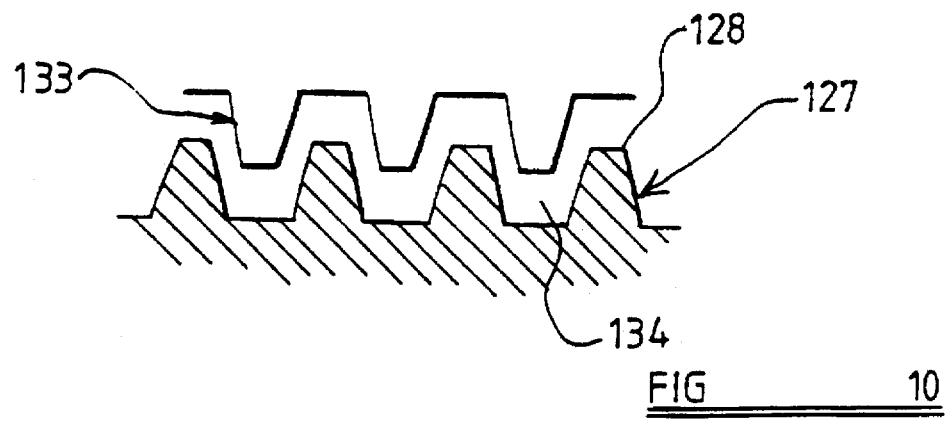
FIG. 10 is a cross-section on the line X—X of FIG. 8.
Figure 11:
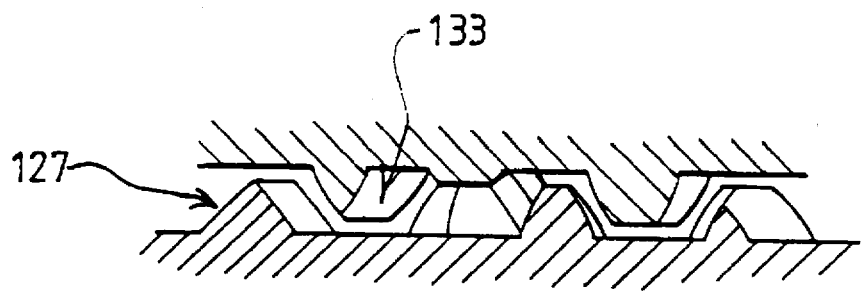
FIG. 11 is a cross-section on the line XI—XI of FIG. 8.

When the rolls 18 and 19 have the form illustrated in FIG. 8, the elongated teeth 133 on one roll extend into gaps 134 between certain pairs of adjacent elongated teeth on the other roll but do not occupy such gaps entirely. Thus, two relatively small parts of each longer flank of each tooth are presented generally towards corresponding parts of flanks of a tooth on the other roll However, as shown in FIG. 10 there is substantial clearance between these parts of the flanks, this clearance being somewhat greater than the gauge of the sheet material to be processed by the rolls. The teeth on one roll do not enter the gaps 135 between the shorter flanks of adjacent teeth on the other roll. The two rolls 18 and 19 have teeth of identical form, each flank having an involute curve, as viewed in a direction from an edge of the tooth at one boundary of that flank to an edge of the tooth at an opposite boundary of that flank.

The action of each of the rolls 18 and 19 on the sheet material is the same as the action of the other of these rolls.

The sheet material which results from the process illustrated in FIG. 4 is suitable for use on its own as a structural member, for example a post or a beam. For these purposes, sheet material of channel form is particularly suitable, the channel having flanges and a web which maintains the flanges a predetermined distance apart, surfaces of both the flanges and the web having rows of projections and depressions. In certain cases, projections and depressions may be required on only a part of the surface of the sheet material. The invention is applicable with especial advantage to studs used in stud and panel partitions and to the channels in which lower end portions and upper end portions of the studs are received.

For other purposes, generally flat material or section other than a channel are useful. There may be a substituted for the roll pair 18, 19 a pair of rolls, both of which have the form illustrated in FIG. 8, or a pair of rolls which are not identical, for example, one having square teeth and the other having elongated teeth.

The sheet material is preferably mild steel, which may be galvanised or otherwise coated for protection against corrosion. Modification of initially plain, galvanised mild steel sheet in the manner hereinbefore described leaves the protective coating intact. The gauge of the plain sheet material is typically within the range 0.3 to 0.7 min.

I claim:

1. A method of cold rolling sheet material, the method comprising passing sheet material having plain surfaces and a gauge g between rolls rotated at the same speed and in opposite directions, rows of teeth being present on the outside surface of the rolls, each tooth having four flanks of involute form and each flank facing in a direction between an axial direction and a circumferential direction, the rolls being spaced apart by a distance such that the teeth on one roll extend into gaps between teeth on the other roll, whereby the projections are formed on both surfaces of the sheet during its passage between the rolls, and a corresponding depression underlies each projection on the other surface of the sheet, the relative positions of the projections and depressions being such that lines drawn on a surface of the sheet between adjacent rows of projections and depressions are non-rectilinear, and the overall thickness t of the deformed sheet material is no more than four times the gauge g and the length is reduced by no more than 15%.

2. A method according to claim 1, wherein the passage of the plain sheet through the rolls is arranged to increase the thickness to between two or three times the gauge.

3. A method according to claim 1, wherein passage of the plain sheet between the rolls is arranged to reduce the length of the sheet material to 95% to 100% of the initial length.

4. A method according to claim 1, wherein the gauge g is 0.3 mm to 0.7 mm.

5. A method according to claim 1, wherein the sheet material is a mild steel.

6. A method according to claim 5, wherein the sheet material is galvanized mild steel.

7. A method according to claim 1, including the subsequent step of passing the deformed sheet between roll pairs to form an article of channel section.

8. A method according to claim 7, wherein the subsequent step is shaping of deformed sheet is to form a partition stud.

9. A method according to claim 1 wherein the teeth on the rolls are arranged in helical rows.

10. Cold rolled sheet material having on both of its surfaces rows of projections, a corresponding depression being present on the surface opposite each projection, the relative positions of the projections and depressions being such that lines drawn in a surface between adjacent rows are non-linear, the rows lying on a line extending between a longitudinal direction and a lateral direction, the overall thickness t being no more than four times the gauge g and wherein the pitch distance between adjacent projections and depressions in each row is within the range of 2 mm to 5 mm and in the range of 4 to 10 times the gauge g.

11. Sheet material according to claim 10, wherein the pitch distance between adjacent projections and depressions in each row is within the range of 2 mm to 5 mm, and in the range of four to ten times the gauge g.

12. Partition stud comprising an article of channel section made of cold rolled sheet material having on both of its surfaces rows of projections, a corresponding depression being present on the surface opposite each projection, the relative positions of the projections and depressions being such that lines drawn on a surface between adjacent rows are non-linear, the rows lying on a line extending between the longitudinal direction and a lateral direction, the overall thickness t being no more than four times the gauge g.

13. A set of rolls for use in cold rolling of plain sheet material, the rolls being rotary cylindrical bodies having rows of teeth on their outer surface, each tooth having four flanks of involute form, each flank facing in a direction between an axial direction and a circumferential direction, the rolls being spaced apart in use by a distance such that the teeth on one roll extend into gaps between the teeth on the other roll, whereby the projections are formed on both surfaces of the sheet during its passage between the rolls, and a corresponding depression underlies each projection on the other surface of the sheet, the relative positions of the projections and depressions being such that lines drawn on a surface of the sheet between adjacent rows of projections and depressions are non-rectilinear, and the overall thickness t of the deformed sheet material is no more than four times the gauge g and the length is reduced by no more than 15%.

14. A set of rolls according to claim 13, wherein the teeth are arranged in helical rows.

* * * * *

UNITED STATES PATENT AND TRADEMARK OFFICE
CERTIFICATE OF CORRECTION

PATENT NO.   : 5,689,990
DATED        : November 25, 1997
INVENTOR(S)  : Geoffrey Thomas Deeley It is certified that error appears in the above-identified patent and that said Letters Patent are hereby corrected as shown below:

On the cover page of patent, after PCT Filed:, change "Feb. 8, 1993" to --May 28, 1993--.

Signed and Sealed this

First Day of September, 1998

Attest:

BRUCE LEHMAN

Attesting Officer

Commissioner of Patents and Trademarks